Jan. 30, 1940.  A. H. AMES  2,188,587

COUPLER

Filed May 21, 1937

Albert H. Ames.
INVENTOR.

BY Howard Fisher
ATTORNEYS.

Patented Jan. 30, 1940

2,188,587

UNITED STATES PATENT OFFICE 2,188,587

COUPLER

Albert H. Ames, St. Paul, Minn.

Application May 21, 1937, Serial No. 143,943

2 Claims. (Cl. 285—193)

My invention relates to a quick attachable and detachable coupling or packing joint for pipes, wherein it is desired to provide a coupling or joint suitable for use in joining together portable lengths of pipe used for irrigating systems and the like.

In recent years it has been customary to transfer liquid used for irrigation purposes, construction work, for watering golf courses and the like, to form a pipe line through the use of portable lengths of pipe which may be quickly attached or detached. These pipes customarily rest upon the surface of the ground and the couplers are so arranged to permit considerable angularity between two lengths of pipe. The couplers are provided with a resilient gasket which permit the insertion of one end of a pipe into a coupler mounted on the end of the next adjacent length of pipe, and to secure this pipe within the coupler without the use of screws, bolts, or any type of tool.

While it is true that some of these former types of couplers may be used for connecting lengths of pipe together, it has been found that many of these couplers are so designed as to cause considerable resistance to water flowing through the same. It is also found that some of these previous types of couplers are somewhat difficult to assemble because of the specific type of connecting means used to connect the pipe to the coupling.

It is the object of my invention to provide a coupling which is designed to permit the flow of water therethrough with a minimum of back pressure. This object I accomplish by forming my coupler in substantially a barrel shape and by forcing water through the coupler into a length of pipe which is connected in definite relation to the coupler. Although the pipe which introduces the liquid into the coupler may be positioned at somewhat of an angle with the axis of the coupler, the water is thus guided with a minimum of friction into the next length of pipe. By accomplishing this result, it is possible for me to use a smaller pump for forcing the liquid through the pipe which means a very substantial saving.

It is a further feature of my invention to provide a coupler, provided with a pivoted attaching loop, and to equip the cooperating end of the pipe with locking lugs which are cam shape, so that by merely forcing the coupler over the end of the pipe, and holding the coupler in correct rotative position with respect to the pipe, the coupler may be automatically latched to the pipe without further movement.

It is a feature of my invention to provide the end of each length of pipe designed for attachment with a coupler, with a foot or rest so as to hold this end of the pipe out of contact with the surface of the ground. By this means, the coupler may be inserted on to the end of the pipe easily and quickly and it is not necessary to lift the end of each piece of pipe out of contact with the ground before it can be inserted into the coupler.

In connecting pipes of this type, each length of pipe is carried, if possible, by a single man who necessarily must carry the pipe near the center thereof for correct balance. With my construction, the coupler on the end of the pipe may be attached on to the end of the pipe without dropping the pipe and proceeding to the coupler end thereof from which position the pipe is difficult to handle.

It is a further feature of my invention to provide a substantially V-shape gasket cross-section, having the outer wall of the gasket flare outwardly while the inner wall thereof flares inwardly into contact with the inserted pipe. With this type of gasket any force tending to pull the gasket out of proper position, will act to spread the gasket, thus more firmly holding the same in place.

These and other objects and novel features of my invention will be more clearly and fully set forth in the following specification and claims.

In the drawing forming a part of my specification:

Figure 1:
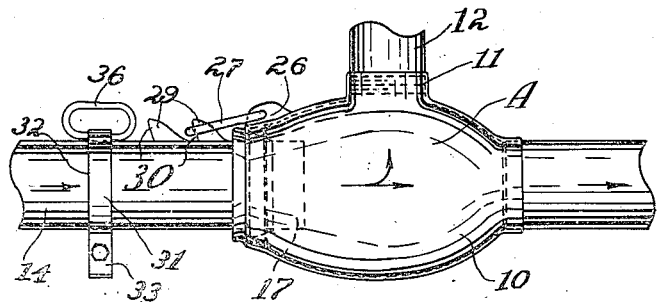
Figure 1 is a side elevation view of my coupling and pipe supporting means.
Figure 2:
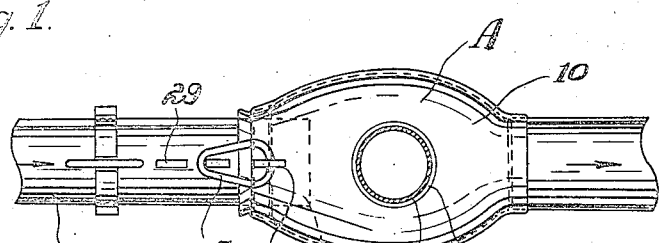
Figure 2 is a plan view of the coupler and attached pipe illustrated in Figure 1.

The coupling A is formed with a substantially oval shape body 10, having at the top thereof a substantially disposed boss 11. The boss 11 is internally threaded or otherwise equipped to accommodate a suitable riser pipe 12 upon which a sprinkler head or other device may be mounted. If it is desired, a plug may be substituted for the riser pipe where it is desired to convey all of the liquid directly through the coupling A.

An opening 12 is provided at one end of the body 10 to accommodate the end of the tube or pipe 14. An annular shoulder 15 in the opening 13 limits the insertion of the pipe 14 into the opening 13. In usual practice the end of the pipe 14 is welded to the body 10 adjacent the opening 13, to provide an integral connection between these elements.

A flared opening 16 provides a substantially frustro-conical surface into which the end 17 of the pipe 14 may extend. This flared opening 16 acts to guide the end of the pipe into proper position within the coupling A during the insertion thereof. The flaring of the opening 16 also permits the pipe 14 to be inserted into the coupling A at a considerable angle with respect to the axis of the opening 16 as illustrated by the dotted outline in Figure 3 of the drawing.

Figure 4:
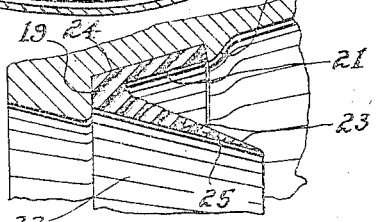
Figure 4 is an enlarged sectional detail illustrating in cross-section my gasket construction.

The flared opening 16 provides a shoulder 19 best illustrated in Figure 4 of the drawing, and between this shoulder 19 and an annular shoulder 20 spaced from the shoulder 19 on the body 10, the outer flaring wall 21 of the gasket 22 is positioned. The outer flaring wall 21 is relatively heavy and tends to hold a circular shape when in position between the shoulders 19 and 20. The gasket 22 is provided with an inwardly flaring wall 23 which is thick at one end 24 thereof, where the wall 23 connects with the wall 21 but is tapered to a feathered edge 25 at the opposite end of the same. The feathered end 25 of the wall 23 engages the end 17 of the pipe 14 as this pipe is inserted into place, and forms a seal between the body 10 of the gasket A and the pipe 14.

An ear 26 is provided on the outer surface of the body 10, and through this ear 26 is pivoted a link or loop 27. This link or loop 27 overlies the outer flared surface of the opening 16, which holds the link from pivoting down to any great extent over the opening 16. Accordingly, this link can not block entrance of the pipe 14 into the opening 16.

Radially extending from the pipe 14 adjacent the end 17, I provide a pair of cam-shape locking lugs 29. These lugs 29 slope upwardly from the end 17 to the rear surface thereof, which surface 30 is at a slight angle to the vertical on the surface of the pipe 14. The coupling A may be cleared on to the pipe until the link 27 engages over the locking surface 30 of the lock, and the link 27 in this way holds the pipe 14 firmly engaged in the coupling A. The first lug 29 is ordinarily engaged by the link 27, but if it is desired to insert the end 17 farther into the coupling A, the second lug 29 may be engaged thereby.

In order to properly support the end 17 of the pipe 14 out of engagement with the surface of the ground, I provide a foot or support 31. This support 31 in the form disclosed, comprises a band 32 extending around the pipe 14, and having a pair of parallel downwardly extending ends 33 which terminate in horizontally extending seats 34. A bolt 35 extends through the downwardly extending portions 33 to clamp the stand 31 about the pipe 14. A handle 36 may also be held in position by the band 32 so that the end of the pipe may be lifted, if desired, by this means.

Figures 6, 7:
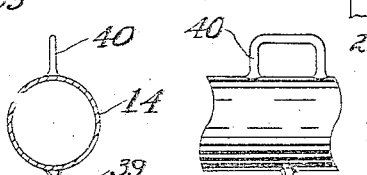
Figure 6 is a sectional view through the end of a pipe illustrating a modified form of pipe supporting means.
Figure 7 is a side elevation of a portion of a pipe showing the supporting construction illustrated in Figure 6.

In Figures 6 and 7 of the drawing, I disclose an alternate type of pipe supporting means. In this form the pipe 14 is supported upon a spike 37 adapted to extend down into the ground. A shoulder 39 on the spike 37 prevents the spike from going down too far into the ground. A separate handle such as 40 may be welded to the top of the pipe, by means of which the pipe may be lifted when necessary.

The operation of my coupler is believed clear from the foregoing description. When the first length of pipe 14 is rested upon the ground, the end 17 thereof is supported above the ground by the supporting means 31. Another length of pipe is added by merely forcing the coupler over the end 17 of the pipe in correct angular position, so that the link 27 locks over one of the lugs 29. It is apparent that with this construction a considerable length of pipe may be constructed in an extremely short time.

Figure 3:
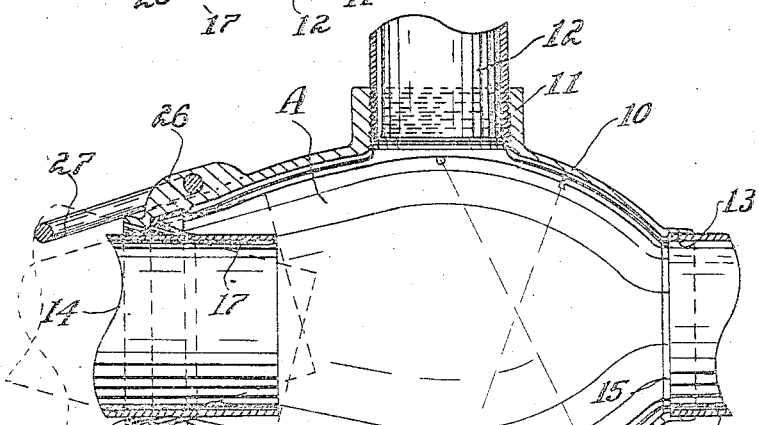
Figure 3 is a cross-sectional view through the body of my coupler showing the construction thereof.
Figure 5:
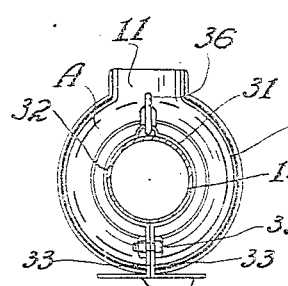
Figure 5 is an end view of the coupler and pipe supporting means illustrated in Figures 1 and 2 of the drawing.

The body A of the coupler is formed with an arcuated inner surface from one end to the other, as indicated by the radius lines in Figure 3, to provide a smooth flowing surface for the water from the main pipe lines longitudinally through the coupler as well as to the riser or distributing pipe 12.

The hook lugs 29 on the connecting end of the pipe line 14, provide an easy engagement with the bale or link 27 in inserting the pipe 14 into the coupler A. Further, it is important that the hook lugs 29 be formed with a long sloping incline 30 so as to permit the link 27 to be disengaged from the hook lugs 29 by prying the link 27 free from the same when it is desired to change a section of the pipe line or to disconnect the sections of the pipe line.

The shape of the link 20 is such as to permit the pipe line to be adjusted readily horizontally as well as vertically. In fact, the coupler A provides an universal joint with the end of the pipe line extending into the coupler adjacent the link 27.

In accordance with the patent statutes, I have described the principles of operation and construction of my coupling, and while I have endeavored to set forth the best embodiment thereof, I desire to have it understood that this is only illustrative of a means of carrying out my invention and that obvious changes may be made within the scope of the following claims without departing from the spirit of my invention.

I claim:

1. In a coupling having oppositely disposed openings for receiving the opposed ends of pipes, means to latch the pipe in the coupling comprising a ring-shaped member pivoted adjacent one of said openings to said coupling, said member being so pivoted that it is restrained from dropping across said one opening in the coupling, a lug on the pipe near the end thereof, a cam face on said lug designed to raise said member about to pivot as said pipe is inserted into the coupling so that the ring will drop by gravity behind said lug, said lug forming a shoulder against which said ring-shaped member may engage to lock said pipe in said coupling.

2. In a coupling having oppositely disposed openings for receiving the opposed ends of pipes, means to latch the pipe in the coupling comprising a ring-shaped member pivoted to the coupling adjacent one of said openings, said member being so pivoted that it is restrained from dropping across the opening in the coupling, a series of aligned lugs on the pipe near one end thereof, a cam face on each said lug designed to raise said ring member about its pivot as the pipe is inserted into the coupling so that said ring will drop by gravity behind each said lug, each said lug forming a shoulder against which said ring-shaped member may engage to lock said pipe in said coupling.

ALBERT H. AMES.